(12) United States Patent
Zhang

(10) Patent No.: US 9,189,314 B2
(45) Date of Patent: Nov. 17, 2015

(54) ELECTRONIC DEVICE AND METHOD FOR DETECTING FIRMWARE OF BMC

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wen-Jie Zhang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 14/139,792

(22) Filed: Dec. 23, 2013

(65) Prior Publication Data
US 2015/0052381 A1 Feb. 19, 2015

(30) Foreign Application Priority Data

Aug. 13, 2013 (CN) .......................... 2013 1 0350468

(51) Int. Cl.
*G06F 11/00* (2006.01)
*G06F 11/07* (2006.01)
*G06F 11/30* (2006.01)

(52) U.S. Cl.
CPC ........ *G06F 11/0757* (2013.01); *G06F 11/3058* (2013.01)

(58) Field of Classification Search
None
See application file for complete search history.

(56) References Cited

U.S. PATENT DOCUMENTS

| | | | |
|---|---|---|---|
| 6,931,568 B2 * | 8/2005 | Abbondanzio et al. | 714/11 |
| 7,779,157 B2 * | 8/2010 | Meyer et al. | 709/244 |
| 2004/0073833 A1 * | 4/2004 | Krishnamurthy et al. | 714/10 |
| 2004/0153697 A1 * | 8/2004 | Chang et al. | 714/4 |
| 2005/0228888 A1 * | 10/2005 | Mihm et al. | 709/227 |
| 2007/0169088 A1 * | 7/2007 | Lambert et al. | 717/168 |
| 2007/0294575 A1 * | 12/2007 | Aichelen et al. | 714/13 |
| 2008/0256525 A1 * | 10/2008 | Ellsworth et al. | 717/168 |
| 2012/0110378 A1 * | 5/2012 | Fan et al. | 714/15 |
| 2012/0110379 A1 * | 5/2012 | Shao et al. | 714/15 |
| 2014/0129865 A1 * | 5/2014 | Kojima | 713/324 |
| 2014/0211637 A1 * | 7/2014 | Sawal et al. | 370/244 |

* cited by examiner

*Primary Examiner* — Gabriel Chu
(74) *Attorney, Agent, or Firm* — Novak Druce Connolly Bove + Quigg LLP

(57) ABSTRACT

In a method of detecting firmware using a first electronic device, the first electronic device comprises a first baseboard management controller (BMC). The first electronic device receives a first message of requiring the first electronic device from a host computer, to detect whether firmware of a second BMC of a second electronic device runs in a normal state. The electronic device sends a second message of requiring the second BMC to obtain whether firmware of the second BMC runs in the normal state. Once the second BMC dose not response to the second message in a first predetermined time period, the electronic device recovers the firmware of the second BMC using firmware of the first BMC.

12 Claims, 3 Drawing Sheets

ELECTRONIC DEVICE AND METHOD FOR DETECTING FIRMWARE OF BMC

BACKGROUND

1. Technical Field

Embodiments of the present disclosure relates to detecting technology, and more particularly to an electronic device and a method for detecting firmware of a baseboard management controller (BMC).

2. Description of Related Art

Generally, a server container includes a plurality of the servers. Each server includes a baseboard management controller (BMC), which acts as a monitoring unit to monitor health states of the server. However, if the firmware of the BMC runs in an abnormal state, the health states of the server cannot be monitored by the BMC. Therefore, what is needed, is an electronic device and a method to improve the prior art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
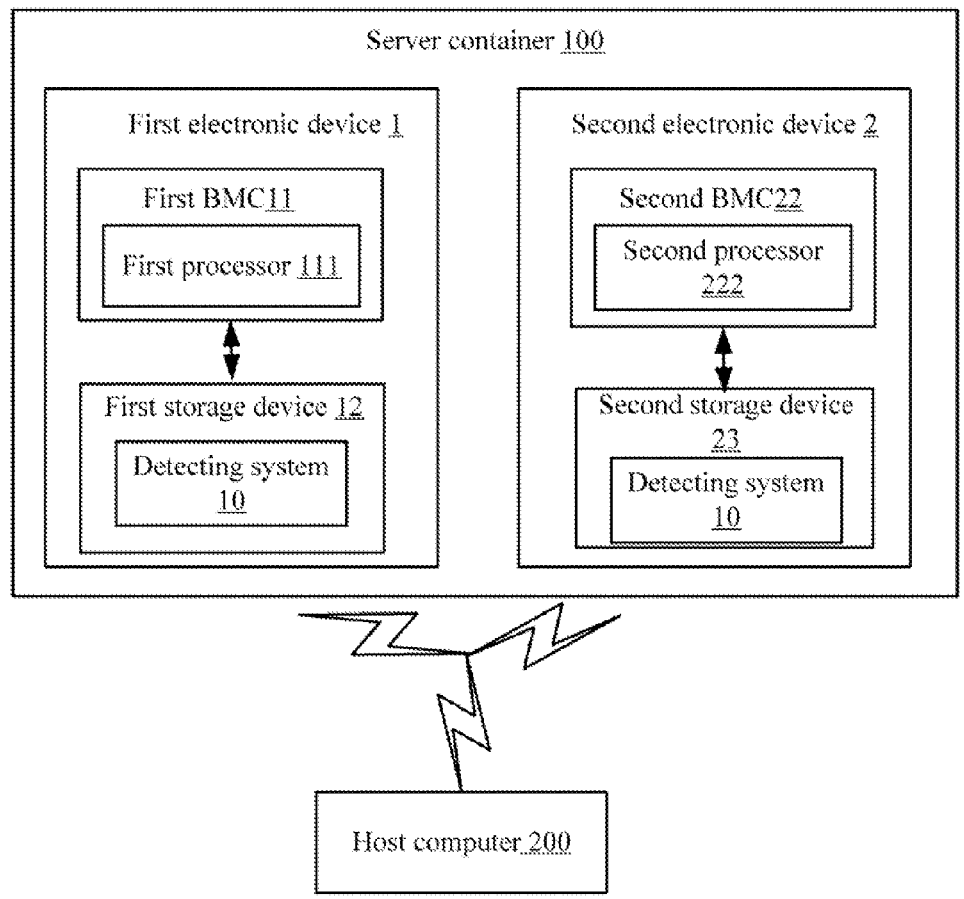
FIG. 1 is a block diagram of one embodiment of a first electronic device and a second electronic device including a detecting system.

FIG. 1 is a block diagram of one embodiment of a server container 100 including a plurality of electronic devices. In this embodiment, the server container 100 includes a first electronic device 1 and a second electronic device 2. Both the first electronic device 1 and the second electronic device 2 are in communication with a host computer 200. The first electronic device 1 and the second electronic device 2 may be computers or servers.

The first electronic device 1 includes a first baseboard management controller (BMC) 11, which includes a first processor 111. The first BMC 11 is connected to a first storage device 12 that stores firmware of the first BMC 11. The second electronic device 2 includes a second BMC 22, which includes a second processor 222. The second BMC 22 is connected to a second storage device 23 that stores firmware of the second BMC 22.

In one embodiment, the firmware of the first BMC 11 is the same as the firmware of the second BMC 22. The first storage device 12 and the second storage device 23 may be flash memory devices or other nonvolatile memory devices.

In this embodiment, the host computer 200 is configured with a function of a Dynamic Host computer Configuration Protocol (DHCP). The host computer 200 allocates Internet Protocol (IP) address for the first electronic device 1, the first BMC 11, the second electronic device 2, and the second BMC 22, to enable communication between each other.

In one embodiment, the host computer 200 further allocates tasks for the first electronic device 1 and/or the second electronic device 2. The host computer 200 allocates the tasks by sending a first message to the first electronic device 1 and/or the second electronic device 2.

For example, the host computer 200 sends the first message of requiring the first electronic device 1 to detect whether the firmware of the second BMC 22 runs in a normal state. The host computer 200 sends the first message of requiring the second electronic device 2 to detect whether the firmware of the first BMC 11 runs in the normal state.

In one embodiment, each of the first electronic device 1 and the second electronic device 2 includes a detecting system 10. The detecting system 10 detects whether the firmware of either the first BMC 11 or the second BMC 22 runs in the normal state, when the first message is received from the host computer 200. The detecting system 10 further recovers the firmware of the first BMC 11 using the firmware of the second BMC 22, when the firmware of the first BMC 11 runs in an abnormal state, and recovers the firmware of the second BMC 22 using the firmware of the first BMC 11 when the firmware of the second BMC 22 runs in an abnormal state.

Figure 2:
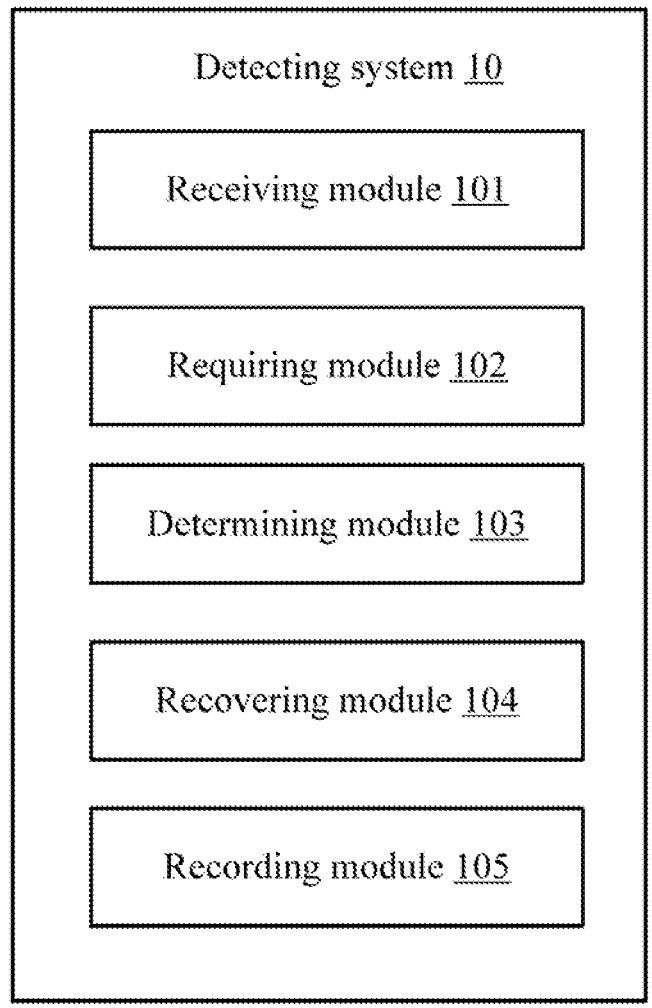
FIG. 2 is a block diagram of function modules of the detecting system included in the first and second electronic devices of FIG. 1.

FIG. 2 is a block diagram of function modules of the detecting system 10 of FIG. 1. In this embodiment, the detecting system 10 may include a receiving module 101, a requiring module 102, a determining module 103, a recovering module 104, and a recording module 105. The modules 101-105 includes computerized codes in the form of one or more programs that may be stored in the first storage device 12 or the second storage device 23. The computerized code includes instructions that are executed by the first processor 111 and the second processor 222

Figure 3:
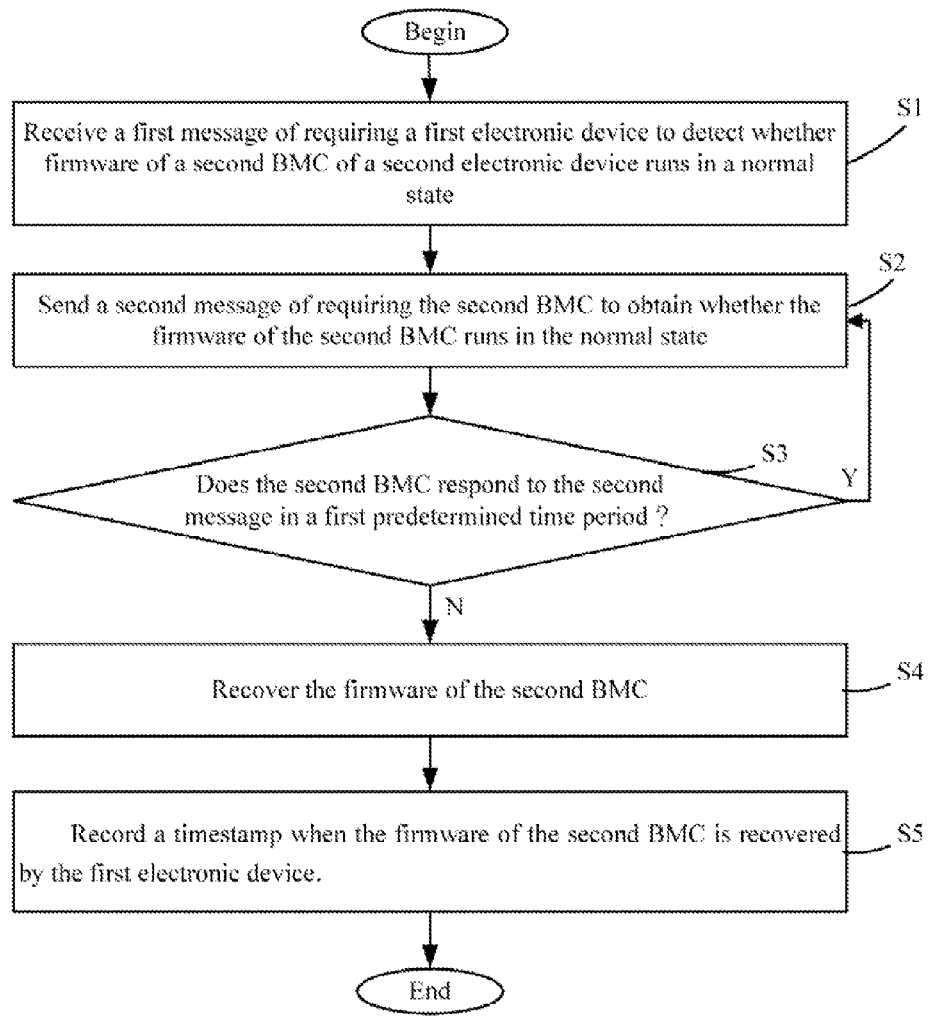
FIG. 3 is a flowchart of one embodiment of a detecting method to detect firmware.

FIG. 3 is a flowchart of one embodiment of a method of detecting firmware. Depending on the embodiments, additional steps may be added, others deleted, and the ordering of the steps may be changed.

In step S1, the receiving module 101 receives a first message from the host computer 200. In one embodiment, the host computer 200 sends the first message of requiring the first electronic device 1 to detect whether the firmware of the second BMC 22 runs in the normal state.

In step S2, the requiring module 102 sends a second message of requiring the second BMC 22 to obtain whether the firmware of the second BMC 22 runs in the normal state.

In step S3, the determining module 103 determines whether the second BMC 22 responds to the second message in a first predetermined time period (e.g., 2 minutes or 3 minutes). If the second BMC 22 responds to the second message in the first predetermined time period, the process returns to step S2. If the second BMC 22 does not respond to the second message in the first predetermined time period, the determining module 103 determines that the firmware of the second BMC 22 runs in the abnormal state, and the process goes to step S4.

In one embodiment, if the process returns to step S2, the requiring module 102 resends the second message to the second BMC 22 after a second predetermined time period (e.g., 5 minutes or 10 minutes), to avoid always detecting firmware of the second BMC 22.

In step S4, the recovering module 104 recovers the firmware of the second BMC 22 using the firmware of the first BMC 11. In one embodiment, the recovering module 104 recovers the firmware of the second BMC 22 by obtaining firmware of the first BMC 11 from the first storage device 12, and writes the obtained firmware in the second storage device 23 to complete the firmware recovery operation.

In step S5, the recording module 104 records a timestamp when the firmware of the second BMC 22 is recovered, to facilitate a tester to find out whether the firmware of the second BMC 22 runs in an abnormal state.

From the above steps, we can see that the present invention also can be used to detect firmware of the first BMC 11, when the firmware of the second BMC 22 is detected by the first electronic device 1. The host computer 200 just need to send the second electronic device 2, the first message of requiring the second electronic device 2 to detect whether the firmware of the first BMC 11 runs in the normal state. In the embodiment, the process steps of detecting firmware of the first BMC 11 using the second electronic device 2 are similar to the process of detecting firmware of the second BMC 22 using the first electronic device 1.

Although embodiments of the present disclosure have been specifically described, the present disclosure is not to be construed as being limited thereto. Various changes or modifications may be made to the present disclosure without departing from the scope and spirit of the present disclosure.

What is claimed is:

1. A first electronic device in communication with a second electronic device, the first electronic device comprising:
   a first baseboard management controller (BMC) that comprises a processor;
   a first storage device that stores firmware of the first BMC, and stores a computer-readable program including instructions, which when executed by the processor, causes the processor to:
   receive, from a host computer which is in communication with the first and second electronic device, a first message of requiring the first electronic device to detect whether firmware of a second BMC of the second electronic device runs in a normal state;
   send a second message of requiring the second BMC to obtain whether the firmware of the second BMC runs in the normal state; and
   recover the firmware of the second BMC using the firmware of the first BMC, when the second BMC does not respond to the second message in a first predetermined time period.

2. The first electronic device of claim 1, wherein the processor recovers the firmware of the second BMC by steps of:
   obtaining firmware of the first BMC from the first storage device; and
   writing the obtained firmware in a second storage device of the second electronic device.

3. The first electronic device of claim 1, wherein the processor further:
   resending the second message to the second BMC after a second predetermined time period, when the second BMC responds to the second message in the first predetermined time period.

4. The first electronic device of claim 1, wherein the processor further:
   recording a timestamp when the firmware of the second BMC is recovered.

5. A method of using a first electronic device to detect firmware, the first electronic device comprising a first baseboard management controller (BMC), and a first storage device that stores firmware of the first BMC, the method comprising:
   receiving, from a host computer which is in communication with the first electronic device and a second electronic device, a first message of requiring the first electronic device to detect whether firmware of a second BMC of the second electronic device runs in a normal state;
   sending a second message of requiring the second BMC to obtain whether the firmware of the second BMC runs in the normal state; and
   recovering the firmware of the second BMC using the firmware of the first BMC, when the second BMC does not respond to the second message in a first predetermined time period.

6. The method of claim 5, wherein the firmware of the second BMC is recovered by performing steps of:
   obtaining firmware of the first BMC from the first storage device; and
   writing the obtained firmware in a second storage device of the second electronic device.

7. The method of claim 5, further comprising:
   resending the second message to the second BMC after a second predetermined time period, when the second BMC responds to the second message in the first predetermined time period.

8. The method of claim 5, further comprising:
   recording a timestamp when the firmware of the second BMC is recovered.

9. A non-transitory storage medium having stored thereon instructions that, when executed by a processor of a first electronic device, causes the processor to perform a method for detecting firmware, the first electronic device comprising a first baseboard management controller (BMC) and a first storage device that stores firmware of the first BMC, the method comprising:
   receiving, from a host computer which is in communication with the first electronic device and a second electronic device, a first message of requiring the first electronic device to detect whether firmware of a second BMC of the second electronic device runs in a normal state;
   sending a second message of requiring the second BMC to obtain whether the firmware of the second BMC runs in the normal state; and
   recovering the firmware of the second BMC using the firmware of the first BMC, when the second BMC does not respond to the second message in a first predetermined time period.

10. The non-transitory storage medium of claim 9, wherein the firmware of the second BMC is recovered by steps of:
   obtaining firmware of the first BMC from the first storage device; and
   writing the obtained firmware in a second storage device of the second electronic device.

11. The non-transitory storage medium of claim 9, wherein the method further comprises:
   resending the second message to the second BMC after a second predetermined time period, when the second BMC responds to the second message in the first predetermined time period.

12. The non-transitory storage medium of claim 9, wherein the method further comprises:
   recording a timestamp when the firmware of the second BMC is recovered.

* * * * *